(12) United States Patent
Wang (10) Patent No.: US 10,790,765 B2
(45) Date of Patent: Sep. 29, 2020

(54) ELECTROSTATIC ENERGY COLLECTOR AND ELECTROSTATIC ENERGY COLLECTING METHOD

(71) Applicant: SOUTHERN UNIVERSITY OF SCIENCE AND TECHNOLOGY, Shenzhen (CN)

(72) Inventor: Fei Wang, Shenzhen (CN)

(73) Assignee: Southern University of Science and Technology, Shenzhen (CN)

( * ) Notice: Subject to any disclaimer, the term of this patent is extended or adjusted under 35 U.S.C. 154(b) by 411 days.

(21) Appl. No.: 15/562,746

(22) PCT Filed: Oct. 20, 2015

(86) PCT No.: PCT/CN2015/092293
§ 371 (c)(1),
(2) Date: Sep. 28, 2017

(87) PCT Pub. No.: WO2016/155287
PCT Pub. Date: Oct. 6, 2016

(65) Prior Publication Data
US 2018/0083553 A1    Mar. 22, 2018

(30) Foreign Application Priority Data
Mar. 30, 2015   (CN) .......................... 2015 1 0145166

(51) Int. Cl.
*H02N 1/08*    (2006.01)
*H05F 7/00*    (2006.01)
(Continued)

(52) U.S. Cl.
CPC ............... *H02N 1/08* (2013.01); *H05F 7/00* (2013.01); *H02N 1/00* (2013.01); *H02N 1/06* (2013.01); *H02N 1/12* (2013.01)

(58) Field of Classification Search
CPC .. H02N 1/00; H02N 1/06; H02N 1/08; H02N 1/12; H05F 7/00
(Continued)

(56) References Cited

U.S. PATENT DOCUMENTS 8,129,869 B2    3/2012   Kashiwagi
2006/0113862 A1*  6/2006  Suzuki .................. H01G 7/023
                                                         310/309
(Continued)

FOREIGN PATENT DOCUMENTS

CN    101944860 A    1/2011
CN    102159649 A    8/2011
(Continued)

OTHER PUBLICATIONS

International Search Report, dated Jan. 13, 2016, from International Application No. PCT/CN2015/092293, filed on Oct. 20, 2015. Chinese and English. Six pages.

*Primary Examiner* — Shawki S Ismail
*Assistant Examiner* — Demetries A Gibson
(74) *Attorney, Agent, or Firm* — HoustonHogle LLP (57) ABSTRACT

An electrostatic energy collector and an electrostatic energy collecting method. The electrostatic energy collector comprises: a vibrating table (101), the vibrating table being fixedly connected to a first end of a first cross beam (102) and a first end of a second cross beam (103), the first cross beam being parallel to the second cross beam, a vertical projection of the first cross beam being overlapped with that of the second cross beam, both of the first cross beam and the second cross beam being conductors, a first mass block (104) being fixedly arranged on the first cross beam, an electret layer (106) being coated at the side, close to the first cross beam, of the second cross beam, a second mass block (105) being fixed at the sided, facing away from the first cross beam, of the second cross beam, a first lead (107) being connected to the first cross beam and a first end of a load (109), and a second lead (108) being connected to the cross beam and a second end of the load. The electrostatic energy collector and the electrostatic energy collecting method can improve energy connection efficiency.

2 Claims, 6 Drawing Sheets

(51) Int. Cl.
*H02N 1/00* (2006.01)
*H02N 1/06* (2006.01)
*H02N 1/12* (2006.01)

(58) Field of Classification Search
USPC .......................................... 310/300, 309, 310
See application file for complete search history.

(56) References Cited

U.S. PATENT DOCUMENTS

| | | | | |
|---|---|---|---|---|
| 2008/0111444 | A1* | 5/2008 | Mabuchi | H02N 1/006 310/309 |
| 2011/0166299 | A1* | 7/2011 | Kashiwagi | H02N 1/00 525/381 |
| 2013/0057110 | A1 | 3/2013 | Aoyagi et al. | |
| 2013/0202810 | A1* | 8/2013 | Nakano | H02N 1/00 427/532 |
| 2015/0048715 | A1* | 2/2015 | Zhou | H02N 1/08 310/300 |
| 2016/0197261 | A1* | 7/2016 | Abdelkefi | H01L 41/1136 310/312 |
| 2016/0285391 | A1* | 9/2016 | Asanuma | H02N 1/08 |
| 2016/0294308 | A1* | 10/2016 | Chen | H02N 2/18 |

FOREIGN PATENT DOCUMENTS

| | | |
|---|---|---|
| CN | 104135186 A | 11/2014 |
| CN | 204089638 U | 1/2015 |
| CN | 101941671 | 7/2015 |
| CN | 104811090 A | 7/2015 |
| JP | 2009-044949 A | 2/2009 |
| WO | WO 2014148371 | 9/2014 |

* cited by examiner

ELECTROSTATIC ENERGY COLLECTOR AND ELECTROSTATIC ENERGY COLLECTING METHOD

RELATED APPLICATIONS

This application is a § 371 National Phase Application of International Application No. PCT/CN2015/092293, filed on Oct. 20, 2015, which claims priority, to Chinese Patent Application No. 201510145166.7, filed on Mar. 30, 2015, both of which are incorporated herein by reference in their entirety.

FIELD OF THE INVENTION

The present disclosure relates to energy technologies, and in particular relates to an electrostatic energy harvester and an electrostatic energy harvesting method.

BACKGROUND OF THE INVENTION

In the natural environment, there are solar energy, wind energy, thermal energy, mechanical energy and other different energies. All these energies can be transformed into electric energy, among which, the oscillatory energy is being focused as being pervasive and green. Now the main manner to transform the oscillatory energy into electric energy is by way of a linear resonator harvesting the vibrational energy matching the resonator vibrating frequency, thereby transforming it into electric energy. However, the linear resonator is only effective in harvesting vibrational energy close to the resonating frequency. Once the vibrating frequency of the external environment is shifted from the resonating frequency, the energy harvesting is less effective.

SUMMARY OF THE INVENTION

The embodiments of the present invention provide an electrostatic energy harvester and an electrostatic energy harvesting method to effectively improve the efficiency of vibrational energy harvesting.

The embodiments of the present invention provide an electrostatic energy harvester, which includes:

A vibrostand (101) fixed and connected to a first end of a first cross beam (102) and a first end of a second cross beam (103); the first cross beam (102) is parallel to the second cross beam (103), and perpendicular projections of the first cross beam (102) and the second cross beam (103) are overlapped, both of the first cross beam (102) and the second cross beam (103) are conductors;

a first mass block (104) is fixed on the first cross beam (102), an electret layer (106) is coated on a side of the second cross beam (102) close to the first cross beam (103), a second mass block (105) is fixed on a side of the second cross beam (103) away from the first cross beam (102); the electret layer (106) is an nonconductor;

the first lead (107) is connected to the first cross beam (102) and a first end of a load (109); a second lead (108) is connected to the second cross beam (103) and a second end of the load (109);

when the electret layer (106) is charged, corresponding inductive charges are induced on both of the first cross beam (102) and the second cross beam (103); a plane-parallel capacitor is formed by the first cross beam (102) and the second cross beam (103).

Correspondingly, the embodiments of the present invention provide an electrostatic energy harvesting method, which involves:

A vibrostand (101) fixed and connected to a first end of a first cross beam (102) and a first end of a second cross beam (103); the first cross beam (102) is parallel to the second cross beam (103), and perpendicular projections of the first cross beam (102) and the second cross beam (103) are overlapped, both of the first cross beam (102) and the second cross beam (103) are conductors;

a first mass block (104) is fixed on the first cross beam (102), an electret layer (106) is coated on a side of the second cross beam (102) close to the first cross beam (103), a second mass block (105) is fixed on a side of the second cross beam (103) away from the first cross beam (102); the electret layer (106) is an nonconductor;

the first lead (107) is connected to the first cross beam (102) and a first end of a load (109); a second lead (108) is connected to the second cross beam (103) and a second end of the load (109);

when the electret layer (106) is charged, corresponding inductive charges are induced on both of the first cross beam (102) and the second cross beam (103); a plane-parallel capacitor is formed by the first cross beam (102) and the second cross beam (103);

the method includes:

charging the electret layer (106), such that corresponding inductive charges are induced on both of the first cross beam (102) and the second cross beam (103);

measuring an inherent frequency of a first oscillatory system to acquire a first inherent frequency; the first oscillatory system comprises the first cross beam (102) and the first mass block (104);

measuring an inherent frequency of a second oscillatory system to acquire a second inherent frequency; the second oscillatory system comprises the second cross beam (103) and the second mass block (105); a ratio of a first calculated value and a second calculated value is less than 20%, the first calculated value is an absolute value of the difference between the first inherent frequency and the second inherent frequency, and the second calculated value is a sum of the first inherent frequency and the second inherent frequency;

vibrating the vibrostand (101) and, when a vibrating frequency of the vibrostand (101) is between the first measuring frequency and the second measuring frequency, measuring a voltage on the load (109), the first measuring frequency is less than the first inherent frequency and the second inherent frequency; the second measuring frequency is greater than the first inherent frequency and the second inherent frequency;

calculating a root-mean-square (RMS) power on the load (109) to acquire a corresponding relationship between the RMS power and the vibrating frequency.

In the embodiments of the present invention, an electrostatic energy harvester and an electrostatic energy harvesting method are provided, the method includes: measuring a first inherent frequency of a first oscillatory system and a second inherent frequency of a second oscillatory system, when the first inherent frequency and the second frequency satisfy that a ratio of a first calculated value and a second calculated value is less than 20% (the first calculated value is an absolute value of the difference between the first inherent frequency and the second inherent frequency, and the second calculated value is a sum of the first inherent frequency and the second inherent frequency), vibrating the vibrostand, when a vibrating frequency of the vibrostand is between the first measuring frequency and the second measuring frequency, measuring a voltage on the load, the first measuring frequency is less than the first inherent frequency and the second inherent frequency; the second measuring frequency is greater than the first inherent frequency and the second inherent frequency; calculating a root-mean-square (RMS) power on the load to acquire a corresponding relationship between the RMS power and the vibrating frequency. In the present disclosure, two oscillatory systems are adopted to effectively expand the frequency bandwidth for energy harvesting to thereby improve vibrational energy harvesting efficiency.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions according to the embodiments of the present invention will be described clearly and completely in combination with accompanying drawings. Apparently, the following description are only some embodiments, as opposed to all embodiments, of the present invention. In view of the embodiments of the present disclosure, other embodiments derived by persons of ordinary skill in the art without creative efforts shall be considered within the scope of the invention.

An embodiment of the present invention provides an electrostatic energy harvester, and an electrostatic energy harvesting method are provided, which can effectively improve the vibrational energy harvesting efficiency and will be respectively described in detail.

Figure 1:
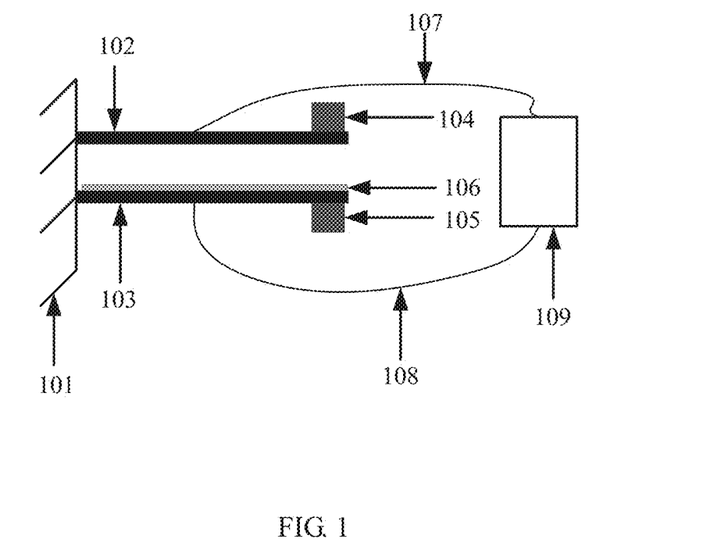
FIG. 1 is an electrostatic energy harvester according to an embodiment of the present invention.

Referring to FIG. 1, which is an electrostatic energy harvester according to an embodiment. As illustrated in FIG. 1, the electrostatic energy harvester, according to the embodiment, includes:

A vibrostand (101) fixed and connected to a first end of a first cross beam (102) and a first end of a second cross beam (103), wherein the first cross beam (102) is parallel to the second cross beam (103), perpendicular projections of the first cross beam (102) and the second cross beam (103) are overlapped, and both of the first cross beam (102) and the second cross beam (103) are conductors.

A first mass block (104) is fixed on the first cross beam (102), an electret layer (106) is coated on a side of the second cross beam (102) close to the first cross beam (103), a second mass block (105) is fixed on a side of the second cross beam (103) away from the first cross beam (102), and the electret layer (106) is a nonconductor.

The first lead (107) is connected to the first cross beam (102) and a first end of a load (109), and a second lead (108) is connected to the second cross beam (103) and a second end of the load (109).

When the electret layer (106) is charged, corresponding inductive charges are induced on both of the first cross beam (102) and the second cross beam (103), and a plane-parallel capacitor is formed by the first cross beam (102) and the second cross beam (103).

In the present embodiment, the vibrostand can be any device that can vibrate and is configured to support and fix heavy objects, and the vibrostand and the first cross beam can be connected by way of a groove or a screw thread, as well as welding or other fixed connection. The first cross beam includes a first end and a second end, the first end of the first cross beam is fixed and connected to the vibrostand. The second cross beam includes a first end and a second end, and the first end of the second cross beam is fixed and connected to the vibrostand. The first cross beam is parallel to the second cross beam, and the materials of the first cross beam and the second cross beam are both conductors that can be induced with charges. For instance, the first cross beam and the second cross beam can both be stainless steel sheets that are 50 mm by length, 15 mm by width and 0.2 mm by thickness. The first cross beam and the first mass block can be connected by way of adhesion, the second cross beam and the second mass block can also be connected by way of adhesion, and an electret layer can be coated on a side of the second cross beam close to the first cross beam. The first lead connects the first cross beam and the first end of the load, the second lead connects the second cross beam and the second end of the load, and the first lead and the second lead can be of copper, aluminum or other leads with excellent electrical conductivity.

Optionally, the material of the electret layer includes inorganic and organic electret materials.

For example, the electret layer can be made of polyvinylidene fluoride (PVDF), Plyimide (PI), Polyethylene terephthalate (PET), Cyclic Olefin Copolymer (COC), CYTOP, Polytetrafluoroethene (PTFE), Parylene and other organic electret materials, or silica $SiO_2$, silica $Si_3N_4$, silica $SiO_2/Si_3N_4$ and other inorganic electret materials.

Figure 2:
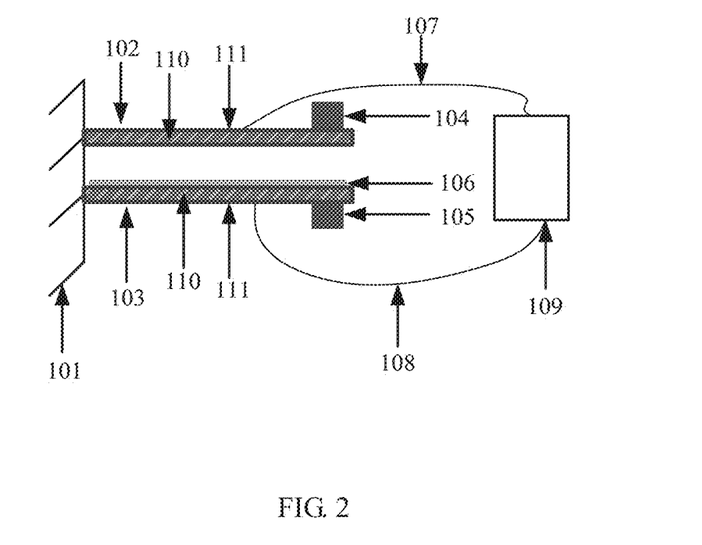
FIG. 2 is an another electrostatic energy harvester according to an embodiment of the present invention.

Referring to FIG. 2, which is an electrostatic energy harvester according to another embodiment. As shown in FIG. 2, in the energy harvester according to the present embodiment, the first cross beam (102) and the second cross beam (103) both include a nonconductor (110) coated with a metal film (111).

In the present embodiment, the nonconductor can be a silica plate, and the metal film can be of iron, tungsten, molybdenum or alloyed metal or any other conductive film. When the electret layer is charged, inductive charges are induced on the first cross beam and the second cross beam through the metal film coated on the surface of the nonconductor. When the first cross beam and the second cross beam adopt different materials, the inherent frequency of the first cross beam and the second cross beam can be changed.

Figure 3:
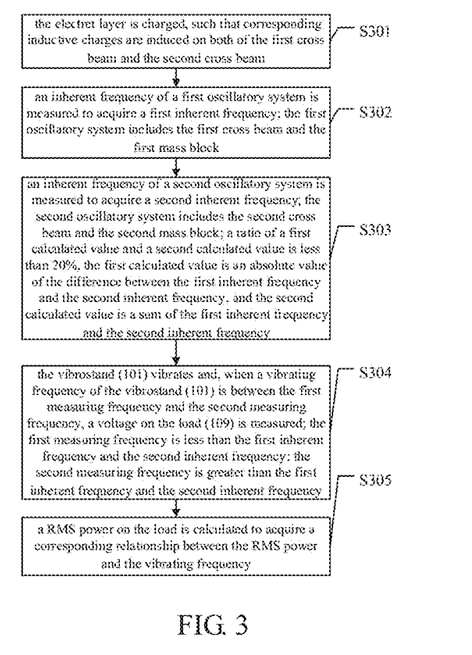
FIG. 3 is a flowchart of an electrostatic energy harvesting method according to an embodiment of the present invention.

Referring to FIG. 3, which is a flowchart of an electrostatic energy harvesting method according to an embodiment. As illustrated in FIG. 3, the electrostatic energy harvesting method, according to the embodiment, involves:

A vibrostand (101) fixed and connected to a first end of a first cross beam (102) and a first end of a second cross beam (103), wherein the first cross beam (102) is parallel to the second cross beam (103), perpendicular projections of the first cross beam (102) and the second cross beam (103) are overlapped, and both of the first cross beam (102) and the second cross beam (103) are conductors.

A first mass block (104) is fixed on the first cross beam (102), an electret layer (106) is coated on a side of the second cross beam (102) close to the first cross beam (103), a second mass block (105) is fixed on a side of the second cross beam (103) away from the first cross beam (102), and the electret layer (106) is a nonconductor.

The first lead (107) is connected to the first cross beam (102) and a first end of a load (109), and a second lead (108) is connected to the second cross beam (103) and a second end of the load (109).

When the electret layer (106) is charged, corresponding inductive charges are induced on both of the first cross beam (102) and the second cross beam (103), and a plane-parallel capacitor is formed by the first cross beam (102) and the second cross beam (103).

The method includes the following steps:

In step S301, the electret layer is charged, such that corresponding inductive charges are induced on both of the first cross beam and the second cross beam.

In the present embodiment, the electret layer is charged by way of electric corona charging to place the electret layer under a high voltage for some time. The electret layer will take on charges, such that corresponding inductive charges are induced on both of the first cross beam and the second cross beam. For example, when the electret layer is charged, the electret layer is being placed under a high voltage of 7000V for five minutes, the electric potential at the surface of the electret layer reaches 350V and massive charges are stored on the electret layer, the first cross beam and the second cross beam, due to the charge induction effect, which produces corresponding inductive charges respectively.

In step S302, an inherent frequency of a first oscillatory system is measured to acquire a first inherent frequency. The first oscillatory system includes the first cross beam and the first mass block.

In the present embodiment, the first cross beam per se has an inherent frequency. The first oscillatory system, including the first cross beam and the first mass block, also has an inherent frequency. As the square of the inherent frequency of the system is inversely proportional to the mass of the entire system, the inherent frequency of the first oscillatory system can be adjusted by changing the mass of the first mass block. The inherent frequency of the first oscillatory system can be measured by frequency sweeping, by measuring the amplitude of vibration of the first oscillatory system under different vibrational frequencies. The vibrational frequency corresponding to the maximal amplitude of the first oscillatory system is determined to be the inherent frequency of the first oscillatory system.

In step S303, an inherent frequency of a second oscillatory system is measured to acquire a second inherent frequency. The second oscillatory system includes the second cross beam and the second mass block. A ratio of a first calculated value and a second calculated value is less than 20%. The first calculated value is an absolute value of the difference between the first inherent frequency and the second inherent frequency, and the second calculated value is a sum of the first inherent frequency and the second inherent frequency.

In the present embodiment, the first calculated value is an absolute value of the difference of the first inherent frequency and the second inherent frequency, and the second calculated value is a sum of the first inherent frequency and the second inherent frequency. The ratio of the first calculated value over the second calculated value is less than 20% to ensure that the energy harvester has a relatively high RMS power output between the first inherent frequency and the second inherent frequency. When the ratio of the first calculated value over the second calculated value is relatively large, the coupling effect of the first oscillatory system and the second oscillatory system are thereby weakened, and a relatively high RMS power output in the frequency range between the first inherent frequency and the second inherent frequency cannot be ensured, thereby resulting the energy harvesting to be of low efficiency.

In step S304, the vibrostand (101) vibrates, and, when a vibrating frequency of the vibrostand (101) is between the first measuring frequency and the second measuring frequency, a voltage on the load (109) is measured. The first measuring frequency is less than the first inherent frequency and the second inherent frequency. The second measuring frequency is greater than the first inherent frequency and the second inherent frequency.

In the present embodiment, when the vibrostand is vibrating, the direction of the vibration is perpendicular to the extending direction of the first cross beam and the second cross beam, the inter-plate distance of the plane-parallel capacitor composed of the first cross beam and the second cross beam will change, such that the charges on the two pole plates of the plane-parallel capacitor changes, and current is produced on the load. The two pole plates can be the two pole plates composed of the first cross beam and the second cross beam. The voltage on the load can be measured in real time to calculate the RMS power on the load. The RMS power is $P=U^2_{rms}(R+r)/R$, where P is the RMS power (the unit is Watt, W), R is the external load (the unit is Ohm, Ω), r is the intrinsic resistance of the test device (the unit is Ohm, Ω), and $U_{rms}$ is the effective value of the voltage on the external load (the unit is Volt, V). The effective voltage value $U_{rms}$ can be calculated by examining the RMS value of the voltages at N different moments, therein:

$$U_{rms} = \sqrt{\frac{U_1^2 + U_2^2 + U_3^2 \ldots + U_N^2}{N}}$$

$U_1, U_2, U_3 \ldots U_N$ are voltages at N different moments.

In step S305, a RMS power on the load is calculated to acquire a corresponding relationship between the RMS power and the vibrating frequency.

In the present embodiment, when the vibrating frequency of the vibrostand is between the first measuring frequency and the second measuring frequency, the voltage on the load is measured to calculate the RMS power on the load to acquire a corresponding relationship between the RMS power and the vibrating frequency. The vibrating frequency corresponding to the maximal value of the RMS power can be found according to the corresponding relationship between the RMS power and the vibrating frequency.

Figure 7:
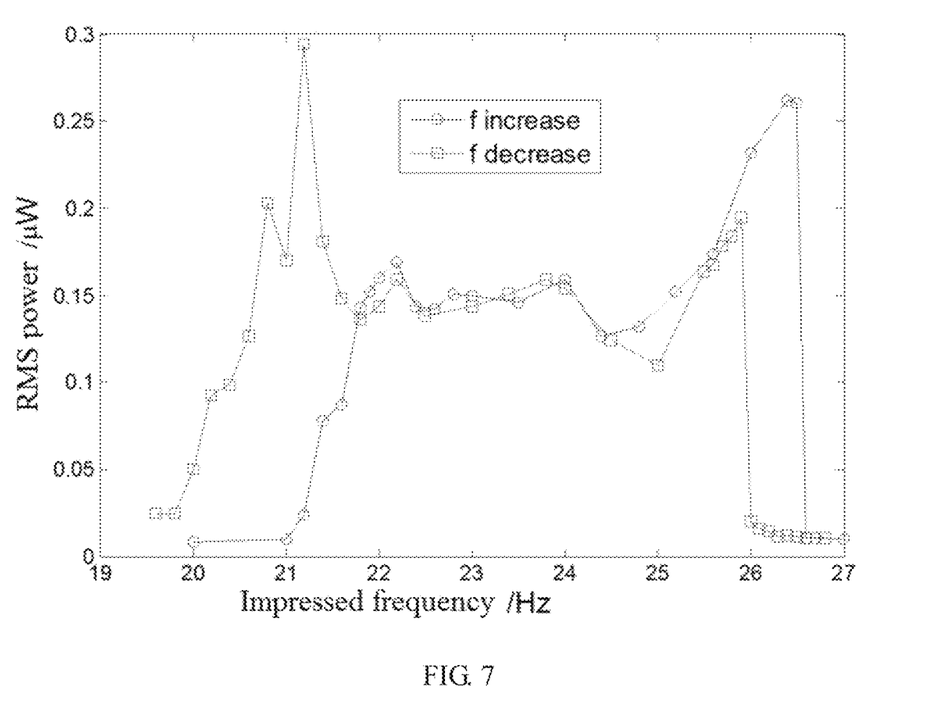
FIG. 7 is test profiles of the RMS power with the impressed frequency changing according to another embodiment of the present invention.

In the embodiments of the present disclosure, as an example, referring to FIG. alternatively, the first cross beam and the second cross beam can both be stainless steel sheets that are 50 mm by length, 15 mm by width and 0.2 mm by thickness. The first cross beam and the second cross beam are opposite and parallel to each other. A first mass block is fixed on the first cross beam, and a second mass block is fixed on the second cross beam. The mass of the first mass block is 3.56 grams and the mass of the second mass block is 0.78 grams, By way of frequency sweeping, the first inherent frequency of the first oscillatory system is measured to be 22.2 Hz, and the second inherent frequency of the second oscillatory system is 26.8 Hz. As shown in FIG. 7, which is test profiles of the RMS power with the impressed frequency changing according to another embodiment. The horizontal is the impressed frequency, and the unit is Hertz (Hz). The vertical is the RMS power on the load, and the unit is microwatt (µW). FIG. 7 includes an ascending frequency curve and a descending frequency curve. It is obvious from FIG. 7 that the RMS power of the load is maintained at a relatively high level when the impressed frequency is from 22.2 Hz to 26.8 Hz. By coupling the two oscillatory systems, the electrostatic energy harvester according to the present embodiment implemented highly effective energy harvesting in the impressed frequency from 22.2 Hz to 26.8 Hz and improved the energy harvesting frequency bandwidth of the electrostatic energy harvester, thereby improving the energy harvesting efficiency of the electrostatic energy harvester.

Figure 5:
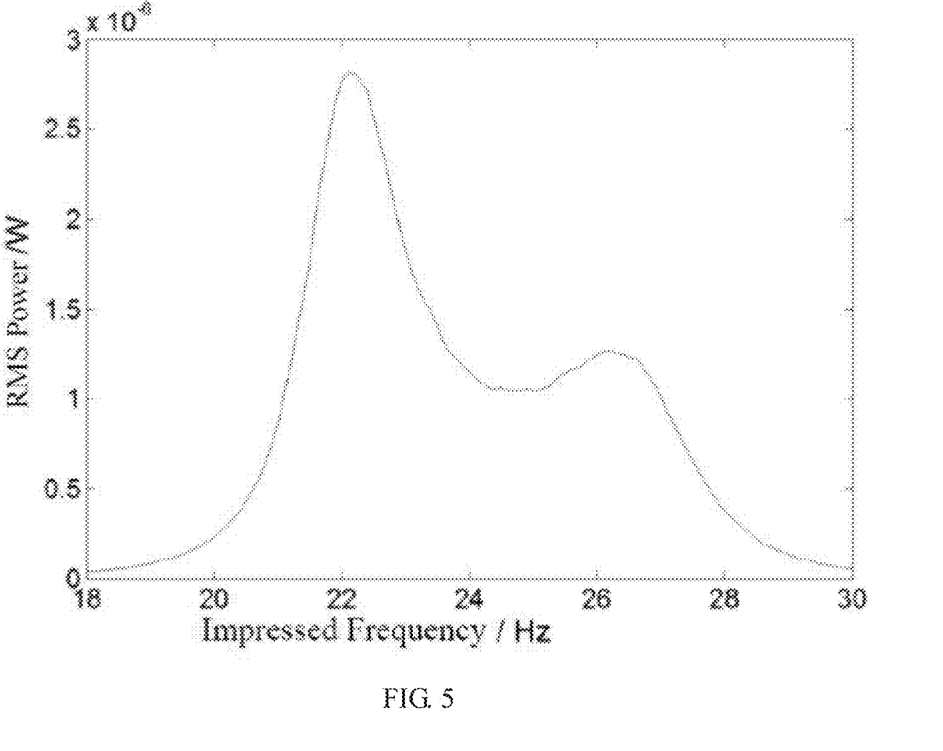
FIG. 5 is simulated graph of the RMS power with the impressed frequency changing according to an embodiment of the present invention.
Figure 6:
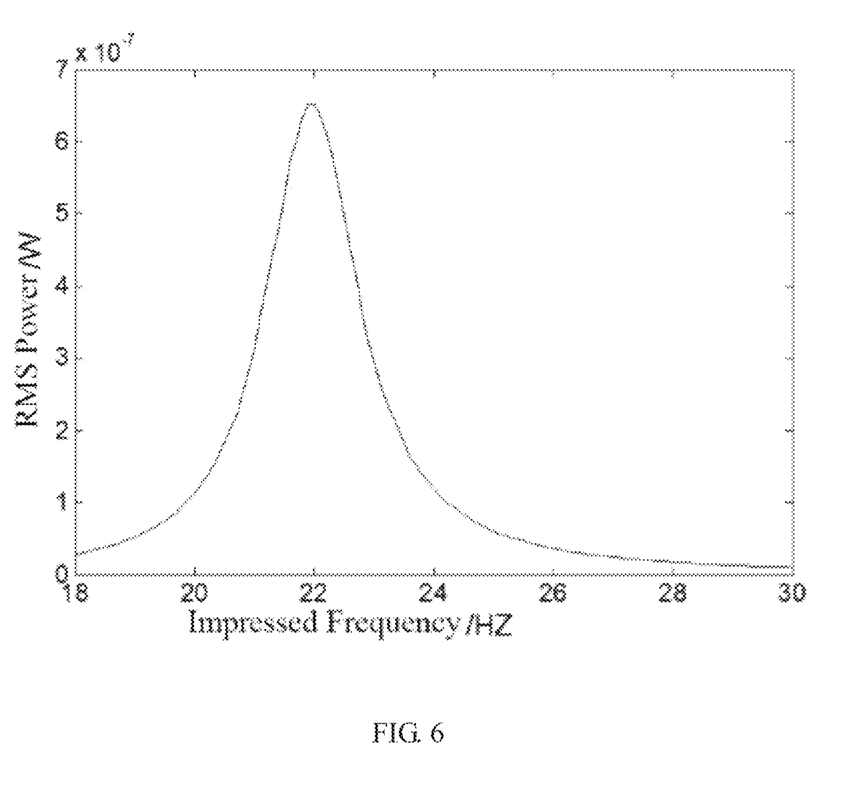
FIG. 6 is simulated profiles of the RMS power with the impressed frequency changing according to another embodiment of the present invention.

As shown in FIG. 5, which is simulated profiles of the RMS power with the impressed frequency changing according to an embodiment. The horizontal is the impressed frequency whose unit is Hertz (HZ), and the vertical is the RMS power of the load whose unit is Watt (W). By calculating the RMS power of the load of the electrostatic energy harvester from 18 Hz to 30 Hz with MATLAB, it can be determined from FIG. 5 that two peaks are produced of the RMS power of the load from 22.2 Hz to 26.8 Hz, and the RMS power of the load is maintained to a relatively high level between 22.2 Hz and 26.8 Hz. FIG. 6 is simulated profiles of the RMS power with the impressed frequency changing according to another embodiment. The horizontal is the impressed frequency whose unit is Hertz (HZ), the vertical is the RMS power of the load whose unit is Watt (W), and by calculating the RIMS power of the load of the electrostatic energy harvester only including the first oscillatory system from 18 Hz to 30 Hz with MATLAB, it can be determined from FIG. 6 that the vibrating frequency corresponding to the peak value of the RMS power is 22.2 Hz. It can be seen from FIG. 5 in combination with FIG. 6 that the energy harvester according to the present disclosure includes a first oscillatory system and a second oscillatory system, the frequency range for energy harvesting is relatively wide, and the energy harvesting according to the present disclosure is of relatively higher efficiency over electrostatic energy harvesters with a single first oscillatory system.

In the present disclosure, the electret layer is charged such that the first cross beam and the second cross beam are both induced with corresponding inductive charges. A first inherent frequency of a first oscillatory system is measured. The first oscillatory system includes a first cross beam and a first mass block. A second inherent frequency of a second oscillatory system is measured. The second oscillatory system includes a second cross beam and a second mass block. The ratio of a first calculated value and a second calculated value is less than 20%. The first calculated value is an absolute value of the difference between the first inherent frequency and the second inherent frequency, and the second calculated value is a sum of the first inherent frequency and the second inherent frequency. The vibrostand vibrates, and when a vibrating frequency of the vibrostand is between the first measuring frequency and the second measuring frequency, a voltage on the load is measured. The first measuring frequency is less than the first inherent frequency and the second inherent frequency. The second measuring frequency is greater than the first inherent frequency and the second inherent frequency. A RMS power on the load is calculated to acquire a corresponding relationship between the RMS power and the vibrating frequency. By adopting the present disclosure, the frequency bandwidth for energy harvesting can be expanded to thereby improve vibrational energy harvesting efficiency.

Figure 4:
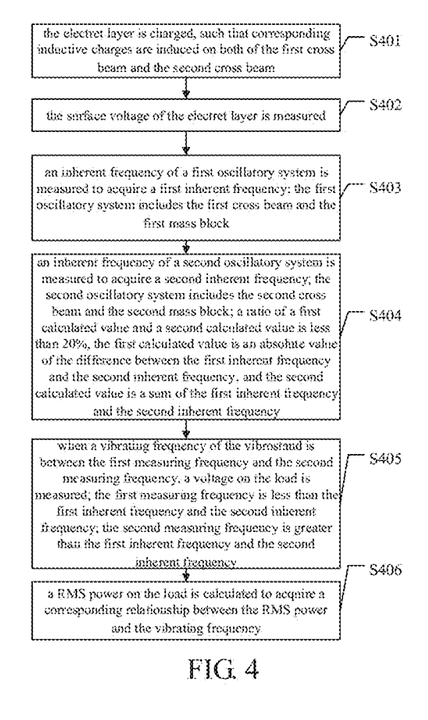
FIG. 4 is a flowchart of another electrostatic energy harvesting method according to embodiment of the present invention.

Referring to FIG. 4, which is a flowchart of an electrostatic energy harvesting method according to another embodiment, as illustrated in FIG. 4, the electrostatic energy harvesting method, according to the embodiment, involves:

A vibrostand (101) fixed and connected to a first end of a first cross beam (102) and a first end of a second cross beam (103). The first cross beam (102) is parallel to the second cross beam (103), and perpendicular projections of the first cross beam (102) and the second cross beam (103) are overlapped. Both of the first cross beam (102) and the second cross beam (103) are conductors.

A first mass block (104) is fixed on the first cross beam (102). An electret layer (106) is coated on a side of the second cross beam (102) close to the first cross beam (103). A second mass block (105) is fixed on a side of the second cross beam (103) away from the first cross beam (102). The electret layer (106) is a nonconductor.

The first lead (107) is connected to the first cross beam (102) and a first end of a load (109). A second lead (108) is connected to the second cross beam (103) and a second end of the load (109).

When the electret layer is charged, corresponding inductive charges are induced on both of the first cross beam (102) and the second cross beam (103). A plane-parallel capacitor is formed by the first cross beam (102) and the second cross beam (103).

The method includes the following steps:

In step S401, the electret layer is charged, such that corresponding inductive charges are induced on both of the first cross beam and the second cross beam.

In step S402, the surface voltage of the electret layer is measured. When the surface voltage of the electret layer exceeds a preset voltage value, steps S403 to S406 are executed.

In the present disclosure, the higher the surface voltage of the electret layer, the more charges stored in the electret layer, and the preset voltage value can be set as required.

In step S403, an inherent frequency of a first oscillatory system is measured to acquire a first inherent frequency. The first oscillatory system includes the first cross beam and the first mass block.

In step S404, an inherent frequency of a second oscillatory system is measured to acquire a second inherent frequency. The second oscillatory system includes the second cross beam and the second mass block. A ratio of a first calculated value and a second calculated value is less than 20%. The first calculated value is an absolute value of the difference between the first inherent frequency and the second inherent frequency, and the second calculated value is a sum of the first inherent frequency and the second inherent frequency.

In step S405, when a vibrating frequency of the vibrostand is between the first measuring frequency and the second measuring frequency, a voltage on the load is measured. The first measuring frequency is less than the first inherent frequency and the second inherent frequency. The second measuring frequency is greater than the first inherent frequency and the second inherent frequency.

In step S406, a RMS power on the load is calculated to acquire a corresponding relationship between the RMS power and the vibrating frequency.

As on step S401 of the present embodiment, one can refer to step S301 in FIG. 3 according to an embodiment. As on steps S403 to S406, one can refer to steps S302 to S305 as illustrated in FIG. 3 according to an embodiment, which are omitted for brevity.

In the present disclosure, the electret layer is charged such that the first cross beam and the second cross beam are both induced with corresponding inductive charges. The surface voltage of the electret layer is measured. When the surface voltage of the electret exceeds a preset voltage value, a first inherent frequency of a first oscillatory system is measured. The first oscillatory system includes a first cross beam and a first mass block. A second inherent frequency of a second oscillatory system is measured. The second oscillatory system includes a second cross beam and a second mass block. The ratio of a first calculated value and a second calculated value is less than 20%. The first calculated value is an absolute value of the difference between the first inherent frequency and the second inherent frequency, and the second calculated value is a sum of the first inherent frequency and the second inherent frequency. The vibrostand vibrates, and when a vibrating frequency of the vibrostand is between the first measuring frequency and the second measuring frequency, a voltage on the load is measured. The first measuring frequency is less than the first inherent frequency and the second inherent frequency. The second measuring frequency is greater than the first inherent frequency and the second inherent frequency. A RMS power on the load is calculated to acquire a corresponding relationship between the RMS power and the vibrating frequency. By adopting the present disclosure, the frequency bandwidth for energy harvesting can be expanded to thereby improve vibrational energy harvesting efficiency.

Although the electrostatic energy harvester and electrostatic energy harvesting method are illustrated and described herein with reference to specific embodiments, the invention is not intended to be limited to the foregoing embodiments which are introduced for the purpose of explaining the methodology and idea thereof. Rather, various modifications may be made by a person skilled in the art in the details within the scope and range of equivalents of the claims without departing from the invention. As such, the description of the specification is not supposed to limit the invention.

What is claimed is:

1. A method of harvesting electrostatic energy, the method involving:
a vibrostand fixed and connected to a first end of a first cross beam and a first end of a second cross beam, wherein the first cross beam is parallel to the second cross beam, the first cross beam is overlapped to the perpendicular projection of the second cross beam, and both of the first cross beam and the second cross beam are conductors;
a first mass block is fixed on the first cross beam, an electret layer is coated on a side of the second cross beam close to the first cross beam, a second mass block is fixed on a side of the second cross beam away from the first cross beam, and the electret layer is a nonconductor;
wherein a first lead is connected to the first cross beam and a first end of a load, and a second lead is connected to the second cross beam and a second end of the load;
wherein when the electret layer is charged, corresponding inductive charges are induced on both of the first cross beam and the second cross beam, and a plane-parallel capacitor is formed by the first cross beam and the second cross beam;
the method comprising:
charging the electret layer, such that corresponding inductive charges are induced on both of the first cross beam and the second cross beam;
measuring an inherent frequency of a first oscillatory system to acquire a first inherent frequency, wherein the first oscillatory system comprises the first cross beam and the first mass block;
measuring an inherent frequency of a second oscillatory system to acquire a second inherent frequency, wherein the first oscillatory system comprises the second cross beam and the second mass block, wherein a ratio of a first calculated value and a second calculated value is less than 20%, the first calculated value is an absolute value of the difference between the first inherent frequency and the second inherent frequency, and the second calculated value is a sum of the first inherent frequency and the second inherent frequency;
vibrating the vibrostand and, when a vibrating frequency of the vibrostand is between the first measuring frequency and the second measuring frequency, measuring a voltage on the load, wherein the first measuring frequency is less than the first inherent frequency and the second inherent frequency, and the second measuring frequency is greater than the first inherent frequency and the second inherent frequency; and
calculating a root-mean-square (RMS) power on the load to acquire a corresponding relationship between the RMS power and the vibrating frequency.

2. The method of claim 1, wherein after charging the electret layer, such that corresponding inductive charges are induced on both of the first cross beam and the second cross beam, the method further comprises:
measuring a surface voltage of the electret layer, and when the surface voltage of the electret layer exceeds a preset voltage value, performing the step of measuring the inherent frequency of the first oscillatory system.

* * * * *